Figures 4, 5:
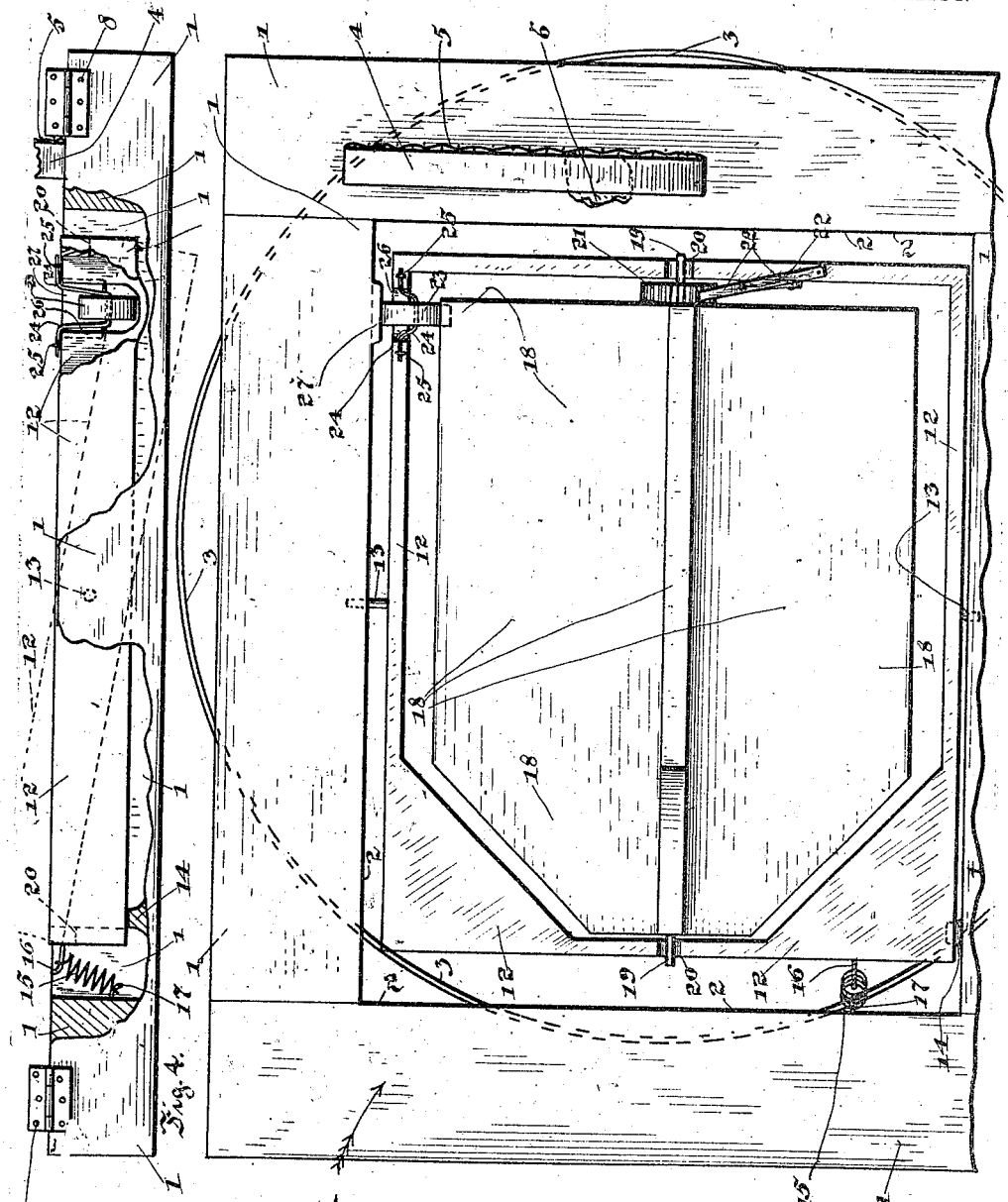

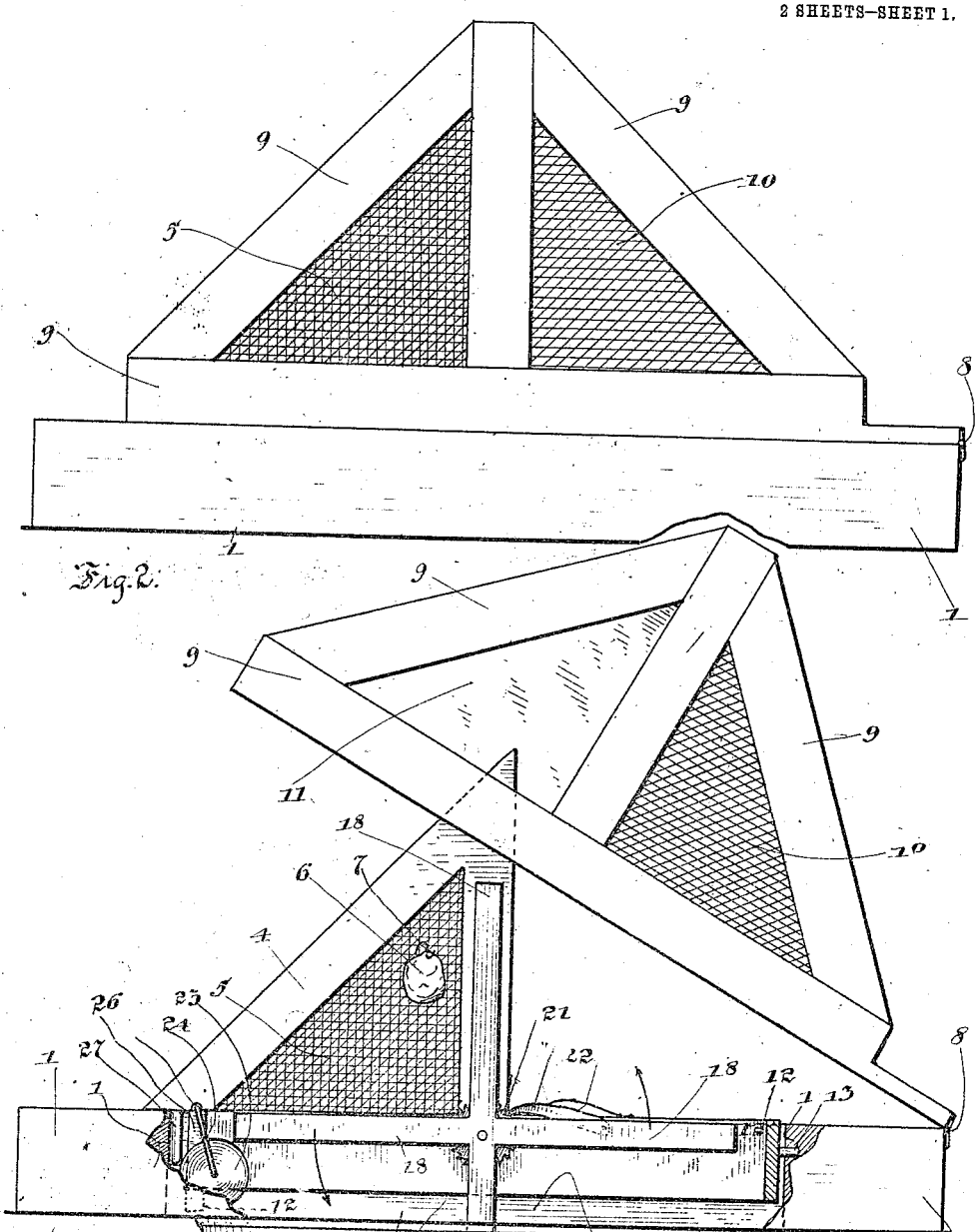

V. A. INDAHL.
ANIMAL TRAP.
APPLICATION FILED FEB. 24, 1911.

1,002,273.

Patented Sept. 5, 1911.

2 SHEETS—SHEET 2.

Witnesses
W. L. Smith
B. G. Richards

Inventor
Victor A. Indahl,
by Joshua R. H. Potts
his Attorney

UNITED STATES PATENT OFFICE.

VICTOR A. INDAHL, OF CHICAGO, ILLINOIS.

ANIMAL-TRAP.

1,002,273.

Specification of Letters Patent. Patented Sept. 5, 1911.

Application filed February 24, 1911. Serial No. 610,507.

*To all whom it may concern:*

Be it known that I, VICTOR A. INDAHL, a citizen of the United States, residing at Chicago, in the county of Cook and State of Illinois, have invented certain new and useful Improvements in Animal-Traps, of which the following is a specification.

My invention relates to improvements in animal-traps.

The object of the invention is the provision of an improved animal-trap of simple construction which shall be so designed as to be capable of capturing and destroying small animals such as rats and mice, and capable of automatically setting itself after an operation thereof, whereby a considerable number of animals may be captured before it requires attention.

The invention consists in the novel construction and arrangement of parts all as will be hereinafter described and more particularly pointed out in the appended claims.

My invention will be best understood by reference to the accompanying drawings forming a part of this specification, and in which, Figure 1 is a front elevation of an animal-trap embodying my invention showing the cover thereof in an open position, Fig. 2 is an elevation similar to Fig. 1 but showing the cover closed, Fig. 3 is a top plan view, the top being removed for clearness of illustration, and Fig. 4 is a side elevation of that portion of the animal-trap shown in Fig. 3.

The preferred form of construction of my invention as illustrated in the accompanying drawings comprises a rectangular casing 1 having a rectangular opening 2 and designed in practice to be arranged over a bucket, tank, or other receptacle 3 partially filled with water for the purpose of drowning the captured animals. The casing 1 is provided with a stationary end wall 4 having a wire mesh covering 5 to which is attached bait 6 by means of a hook 7 for the purpose of alluring the animals into the trap.

Pivoted to the casing 1 by means of hinges 8 is a cover comprising a frame 9 having a wire mesh covering 10, the latter being provided in order that animals caught in the trap may be rendered visible. The hinged cover is of approximately the same size as the casing 1 and is adapted to seat thereon as shown in Fig. 2, the end wall 11 of said cover inclosing and being adjacent to the stationary wall 4 when the cover is closed.

A frame 12 having pivots 13 arranged in opposite edges thereof is mounted for oscillation in the casing 1, one end of said frame being seated on a stop 14 when in the normal position. Said stop projects inwardly from the casing 1 as shown in Fig. 3 and is arranged adjacent a helical spring 15 which connects the casing 1 with the frame 12 and designed to hold the latter normally in contact with the stop 14. A hook 16 projecting from the frame 12 serves to receive one end of the spring 15 and a hook 17 projecting inwardly from the casing 1 serves to hold the other end of said spring, this construction being clearly illustrated in Figs. 3 and 4.

A rotatable member comprising four radial platforms 18 is mounted on the frame 12 by means of pivots 19 removably secured in recesses 20 formed in said frame, the line of direction of the axis represented by the pivots 13 lying at right angles to the axis of the pivots 19, as clearly illustrated in the plan view in Fig. 3. The radial revolving platforms 18 are permitted to move in one direction only about the axis 19, a ratchet wheel 21, and a spring-pressed pawl 22 serving to accomplish this result. The normal positions of the revolving platforms 18 are as shown in Fig. 1, two of the platforms being horizontal and the other two vertical. In order to maintain the platforms in these normal positions a roller 23 is provided on which one edge of a platform 18 seats, as shown in Fig. 1. The roller 23 is supported by a swinging bail 24 which is pivoted to the frame 12 by means of eyelets 25 and designed to swing in a recess 26 provided in said frame. When the frame 12 is in the normal position the side of the roller 23 opposite the portion thereof which contacts with a revolving platform 18 is in contact with a laterally extending portion 27 provided in the casing 1, thus preventing the roller 23 from swinging to permit of the passage of a platform, the relation of these parts being clear by reference to Figs. 1 and 4.

The operation of the trap is as follows: Supposing an animal to be attracted to the trap by the bait 6 and to enter the opening provided in the cover of the trap in the direction indicated by arrows weight will first be imposed upon the end of the platform 12 which is provided with the stop 14, hence the normal position thereof will not be disturbed. When the animal fully enters the trap and approaches the bait 6 a greater weight will be imposed upon the end of the frame nearest said bait than on the other end thereof, consequently this end will fall causing a rotatable platform 18 to be released whereupon the animal will drop into the receptacle 3 and be drowned in the water contained therein. It is apparent that when the frame 12 is oscillated as before described that the roller 23 is moved to a plane below the projection 27, hence the latter will then permit of lateral movement of the roller which will then cease to support the revolving platform 18 on which the animal is temporarily supported. The revolving platforms 18 revolve in the direction indicated, and cannot move in the other direction, consequently after an animal has fallen into the receptacle 3 it cannot escape, the revolving platforms being locked against rotation after each revolution thereof, by means of the pawl and ratchet hereinbefore described.

It will be seen that this trap is simple and comparatively inexpensive of construction, that it is extremely sensitive, and that it automatically resets itself after each trapping operation.

While I have illustrated and described the preferred form of construction for carrying my invention into effect this is capable of variation and modification without departing from the spirit of the invention. I, therefore, do not wish to be limited to the exact details of construction as set forth, but desire to avail myself of such variations and modifications as fairly fall within the spirit and scope of the appended claims.

Having described my invention what I claim as new and desire to secure by Letters Patent is:

1. In an animal-trap, an oscillatory frame; a trap member in said frame; and means on said frame arranged to release said trap member upon oscillation of said frame, substantially as described.

2. In an animal-trap, the combination with a casing having an opening therein, of an oscillatory frame mounted in said opening, a revolving platform mounted in said frame, means mounted in said frame for locking said platform against rotation, and means for releasing the platform upon oscillation of said frame, substantially as described.

3. In an animal-trap, the combination with a casing having an opening therein, of an oscillatory frame mounted in said opening, a revolving platform mounted in said frame, means mounted in said frame for locking said platform against rotation, means mounted on said frame whereby said platform is automatically locked after a limited rotation thereof and released upon oscillation of said frame, substantially as described.

4. In an animal-trap, a receptacle, a casing supported by said receptacle and having an opening leading thereto, an oscillatory frame pivoted in said opening, resilient means connected to said casing for oscillating said frame in one direction, a revolving platform mounted in said frame, means for locking said platform against rotation, and means for releasing said platform upon oscillation of said frame against the resistance of said resilient means, substantially as described.

5. In an animal-trap, a receptacle, a casing supported by said receptacle and having an opening leading thereto, an oscillatory frame pivoted in said opening, resilient means connected to said casing for oscillating said frame in one direction, a revolving platform mounted in said frame for rotation in one direction only, and means for releasing said platform when said frame is oscillated against the resistance of said resilient means, substantially as described.

6. In an animal-trap, the combination with a receptacle, of a rectangular casing having a rectangular opening supported by said receptacle, an oscillatory frame mounted in said opening, a stop and spring adapted to hold said frame in a normally horizontal position, a rotatable member comprising a plurality of revolving platforms mounted in said frame, means for locking said member against rotation, and means for releasing said member upon oscillation of said frame, substantially as described.

7. An animal-trap comprising a receptacle, a casing having an opening supported by said receptacle, an oscillatory frame mounted in said opening, a stop and a helical spring adapted to hold said frame in a normally horizontal position, a rotatable member comprising four radial platforms spaced at 90 degrees to each other and mounted upon said frame, and a roller suspended on said frame and adapted to lock said member against rotation when said frame assumes the horizontal position, said roller being adapted to release said member when said frame is oscillated, substantially as described.

8. An animal-trap comprising a receptacle, a casing having an opening supported by said receptacle, an oscillatory frame mounted in said opening, a stop and a helical spring adapted to hold said frame in a normally horizontal position, a rotatable member comprising four radial platforms spaced at 90 degrees to each other and mounted upon said frame, and a roller suspended on said frame and adapted to lock said member against rotation when said frame assumes the horizontal position, said roller being adapted to release said member when said frame is oscillated, and the axis of said frame lying at right angles to the axis of said member, substantially as described.

In testimony whereof I have signed my name to this specification in the presence of two subscribing witnesses.

VICTOR A. INDAHL.

Witnesses:
  HELEN F. LILLIS,
  JOSHUA R. H. POTTS.